United States Patent [19]

Yamada

[11] 4,408,211

[45] Oct. 4, 1983

[54] INK-JET RECORDING DEVICE FEATURING SEPARATING OF LARGE AND SMALL DROPLETS

[75] Inventor: Takahiro Yamada, Tokai, Japan

[73] Assignees: Hitachi, Ltd.; Hitachi Koki Co., Ltd., both of Tokyo, Japan

[21] Appl. No.: 247,738

[22] Filed: Mar. 26, 1981

[30] Foreign Application Priority Data

Mar. 26, 1980 [JP] Japan .................................. 55/37429

[51] Int. Cl.³ ............................................ G01D 15/18
[52] U.S. Cl. .................................. 346/75; 346/140 R
[58] Field of Search ............................ 346/75, 140 H

[56] References Cited

U.S. PATENT DOCUMENTS 4,050,077 9/1977 Yamada et al. ........................ 346/75

Primary Examiner—Stafford D. Schreyer

Attorney, Agent, or Firm—Antonelli, Terry & Wands

[57] ABSTRACT

A nozzle is supplied with pressurized ink, and is given mechanical vibrations, thereby to generate large-diameter and small-diameter ink droplets successively and alternately from an ink column produced from the front end part of the nozzle. Charging and deflecting electrodes are disposed which charge one of the large-diameter and small-diameter ink droplets developed from the foremost end of the ink column, in response to a recording signal and which exerts a deflecting force on the charged ink droplet simultaneously with the development of the large-diameter and small-diameter ink droplets. Thus, the flight orbits of the charged ink droplets necessary for the recording of an ink-jet recording device and the ink droplets unnecessary for the recording can be separated immediately after the development of the ink droplets.

14 Claims, 3 Drawing Figures

INK-JET RECORDING DEVICE FEATURING SEPARATING OF LARGE AND SMALL DROPLETS

BACKGROUND OF THE INVENTION

This invention relates to ink-jet recording devices. More particularly, it relates to an ink-jet recording device of the charging modulation type which performs recording by exciting a nozzle, alternately spouting large-diameter and small-diameter ink droplets from the nozzle, and charging and deflecting only the droplets required to form a recording picture.

The ink-jet recording device which records with the small-diameter droplets as above stated is disclosed in, for example, U.S. Pat. No. 4,050,077 entitled "Liquid droplet supplying system".

In general, however, charging electrodes and deflecting electrodes are arranged in distant positions, and the droplets charged by the charging electrodes enter the deflecting electrodes and undergo deflecting forces owing to a static electric field established by the deflecting electrodes. The flight orbit of the charged small-diameter droplet to be used for the recording and that of the large-diameter droplet unnecessary for the recording are coincident over a long distance (about 10 mm) after the formation of the droplets. Therefore, before separating the flight orbits of these droplets, the small-diameter droplet combines with the large-diameter droplet, resulting in the disadvantage that the recording with the small-diameter droplet becomes impossible.

SUMMARY OF THE INVENTION

An object of this invention is to provide an ink-jet recording device which is capable of a high quality of recording with small-diameter droplets.

In order to accomplish the object, this invention adopts a construction in which ink droplets separating from an ink column generated at the front end of a nozzle are charged in response to recording signals and are subjected to deflecting forces simultaneously with the appearance of the ink droplets, whereby the flight orbits of the small-diameter ink droplets to be used for the recording and the other ink droplets not required for the recording are separated immediately after the appearance of the ink droplets. More specifically, the principal feature of this invention consists, in an ink-jet recording device which carries out recording by imparting mechanical vibrations to a nozzle supplied with pressurized ink, generating two sorts of, large and small ink droplets from an ink column produced at the front end of a nozzle, and charging and deflecting the small-diameter droplets in correspondence with recording signals, in that means to charge the ink droplets in correspondence with the recording signals and means to exert deflecting forces immediately after the separation of the ink droplets are disposed in a position which includes the ink column and in which the ink droplets separate from the ink column.

DESCRIPTION OF THE PREFERRED EMBODIMENTS

Figure 1:
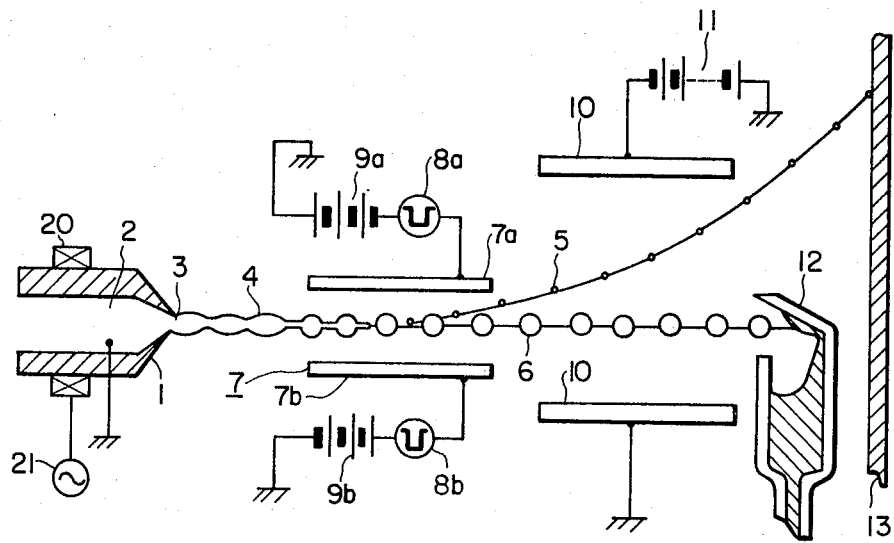
FIG. 1 is a constructional view of an ink-jet recording device of an embodiment of this invention.

Referring to FIG. 1, numeral 1 designates a nozzle, which is supplied with pressurized ink 2 from an ink tank not shown. When the nozzle 1 is vibrated at a high frequency by an electromechanical transducer (for example, piezoelectric element) 20 which is excited by an input signal from a high-frequency power source 21, periodic constrictions appear in an ink column 4 spouted from a nozzle hole 3.

The constriction at the foremost end of the ink column 4 separates from the ink column 4, and a pair of ink droplets, a small-diameter droplet 5 and a large-diameter droplet 6.

Numeral 7 indicates a pair of charging and deflecting electrodes arranged in a position in which the ink droplets 5 and 6 separate from the ink column 4, and in a manner to hold the ink column 4 and the ink droplets 5 and 6 therebetween. The pair of charging and deflecting electrodes 7a and 7b are electrically insulated from each other. One electrode 7a is connected to a bias power source 9a which is connected in series with a recording signal source 8a.

The other electrode 7b is connected to another bias power source 9b of the polarity opposite to that of the bias power source 9a through another signal source 8b.

Numeral 10 indicates a pair of deflecting electrodes for further deflecting the smaller droplet 5 in accordance with the quantity of charges possessed by the smaller droplet 5. One of the electrodes is connected to a D.C. power source 11.

Numeral 12 denotes a gutter for preventing the larger droplet 6 and the smaller droplet 5 not to be used for recording, from reaching a recording medium 13 and for reusing them.

In the device of this invention thus constructed, voltages of the recording signal sources 8a and 8b are applied to the charging and deflecting electrodes 7, and hence, electric lines of force develop between the pair of electrodes 7a and 7b and the grounded ink column 4, so that the ink column 4 is charged by the potentials of both the recording signal sources 8a and 8b.

At this time, if either of the ink droplets 5 and 6 separates from the ink column 4, the formed ink droplet has charges corresponding to the voltage of the recording signal source 8a or 8b.

Therefore, when the smaller droplet 5 necessary for forming a recording pattern separates from the ink column 4, the signals of the recording signal sources 8a and 8b are respectively applied to the charging and deflecting electrodes 7a and 7b, whereby the quantity of charges of the smaller droplet 5 to be charged can be controlled in response to the recording signals.

On the other hand, a static electric field based on the voltages of the bias power sources 9a and 9b is normally established between the charging and deflecting electrodes 7a and 7b. Accordingly, the smaller droplet charged by the recording signals undergoes a deflecting force immediately after having separated from the ink column 4.

At this time, the arrangement is so set that the ink column 4 lies substantially in the middle between the charging and deflecting electrodes 7a and 7b, and the bias power sources 9a and 9b are set at substantially equal potentials. Thus, the potential of the position of the ink column 4 based on the bias voltages becomes the null potential. Therefore, the ink column 4 is not charged by the bias voltages.

Accordingly, the smaller droplet 5 not used for the recording and the larger droplet 6 are not charged and advance rectilinearly inside the deflecting electrodes 10.

Therefore, the flight orbit of the charged smaller droplet 5 to be used for the recording can be separated from that of the larger droplet 6 immediately after the generation of the droplet.

For this reason, even when the flight velocity of the smaller droplet has fluctuated due to the application of the recording signals, the flight orbit of this smaller droplet can be widely shifted from that of the larger droplet before the smaller droplet combines with the larger droplet. It is accordingly possible to prevent an unrecordable state due to the combination between the smaller and larger droplets.

In the above embodiment, the position of the ink column 4 is set substantially in the middle between the charging and deflecting electrodes 7. Since, however, it is only required that the bias potential based on both the bias power sources 9a and 9b is zero, it is also allowed to adjust the voltages of both the power sources 9a and 9b in correspondence with the position of the ink column 4. It is also possible to shift the position of the ink column in correspondence with the magnitudes of the bias power sources 9a and 9b contrariwise.

Figure 2:
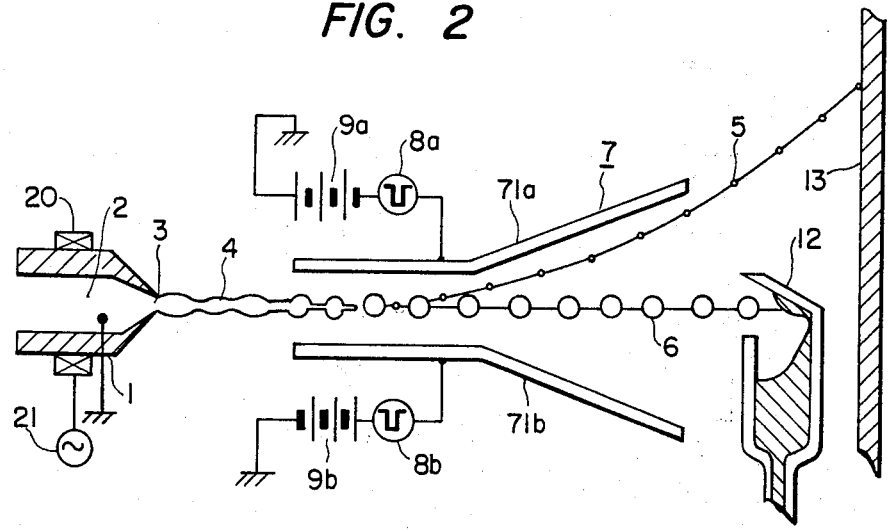
FIG. 2 shows another embodiment of this invention, and is a constructional view of an ink-jet recording device which employs charging and deflecting electrodes.

Further, the deflecting electrodes 10 are separately disposed in the above embodiment. However, it is also possible that as shown in FIG. 2, charging and deflecting electrodes 71a and 71b are extended in the traveling direction of the ink droplets 5 and 6 so as to afford a static electric field necessary for the deflection of the smaller droplet 5 by means of the bias voltages of the bias power sources 9a and 9b.

With such construction, the deflecting electrodes 10 shown in FIG. 1 are dispensed with, and the electrode configuration can be simplified.

Further, the embodiments have been described as generating the two sorts of, larger and smaller ink droplets from the fore end of the nozzle, charging only the smaller droplet with the recording signals, and separating the flight orbit of the smaller droplet from that of the larger droplet immediately after the generation of the ink droplets. This invention, however, is also applicable to a device which performs the recording by generating ink droplets of uniform size from a nozzle and selectively subjecting them to a charging and deflecting control.

Also in this case, the charging and the deflection of the ink droplets can be simultaneously effected by the charging and deflecting electrodes. Therefore, the ink droplet necessary for the recording and the ink droplet unnecessary therefor can have their respective flight orbits separated, so that the influences between the ink droplets by the flights can be reduced to the utmost.

Figure 3:
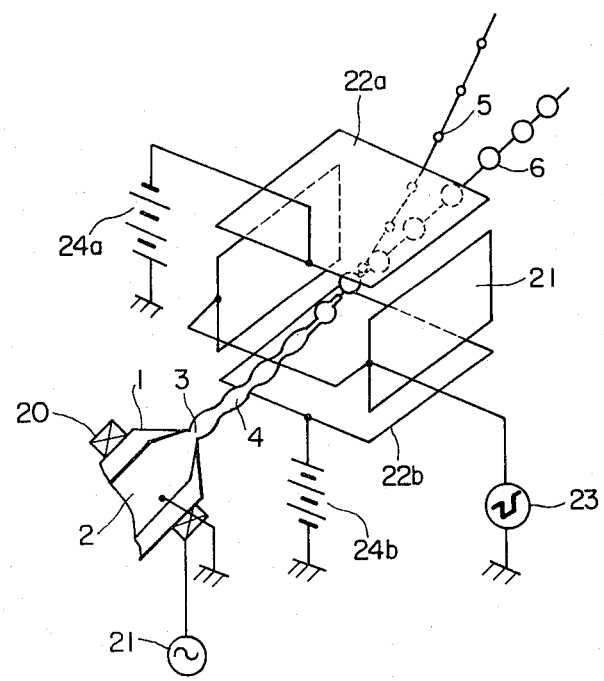
FIG. 3 is a constructional view of a nozzle front-end portion in still another embodiment of this invention.

FIG. 3 shows still another embodiment. In the position in which ink droplets separate at the foremost end of an ink column 4 formed at the fore end of a nozzel 1, charging electrodes 21 are arranged in a manner to hold the ink column 4 and the ink droplets therebetween, and a pair of deflecting electrodes 22a and 22b are arranged in planes intersecting orthogonally to the charging electrodes 21. The charging electrodes 21 are connected to a recording signal source 23. One deflecting electrode 22a is connected to a bias power source 24a, while the other deflecting electrode 22b is connected to a bias power source 24b having a polarity opposite to that of the bias power source 24a.

Accordingly, the potential of the ink column 4 lying in the middle between the pair of deflecting electrodes 22a and 22b becomes null, and the ink column 4 is not charged by the bias voltages.

When the ink droplet 5 separates, a recording signal of predetermined magnitude is applied to the charging electrodes 21 from the recording signal source 23, whereby the small-diameter droplet 5 can be charged.

The charged smaller droplet 5 undergoes a deflecting force immediately after the generation of the droplets and flies in a predetermined direction owing to a static electric field established between the deflecting electrodes 22a and 22b to which the voltages of the bias power sources 24a and 24b are respectively applied.

As set forth above, according to this invention, in a position in which ink droplets separate from an ink column, means to charge the ink droplet in response to a recording signal and means to exert a deflecting force simultaneously with the generation of the ink droplets are disposed in a manner to hold the ink column and the ink droplets therein, whereby the flight orbits of the ink droplet to be used for recording and the ink droplet not required for the recording can be separated immediately after the generation of the ink droplets.

We claim:

1. An ink-jet recording device comprising:
 a nozzle which is supplied with ink pressurized to a predetermined pressure and which spouts an ink column from a nozzle hole thereof,
 vibration applying means to apply mechanical vibrations of predetermined magnitude to said nozzle so as to separate a larger ink droplet and a smaller ink droplet from said ink column alternately and successively and to cause them to fly,
 charging and deflecting means arranged in a manner to hold therein a part of said ink column in which said ink droplets separate and fly from said ink column, said charging and deflecting means charging the smaller one of said ink droplets in response to a recording signal applied to said charging and deflecting means and deflecting the charged ink droplets in correspondence with a quantity of static charges thereon immediately after the separation of said ink droplets from said ink column.

2. An ink-jet recording device according to claim 1, wherein said charging and deflecting means includes a first pair of opposed electrodes arranged so that said ink column and said ink droplets pass therebetween, said first pair of electrodes being insulated from each other, bias voltage between said first pair of electrodes, and recording signal-applying means to apply said recording signal between said first pair of electrodes and said ink column.

3. An ink-jet recording device according to claim 1, wherein said charging and deflecting means includes a first pair of opposed electrodes arranged so that said ink column and said ink droplets pass therebetween, said first pair of electrodes being insulated from each other, and recording signal-applying means to apply said recording signal to said first pair of electrodes, and a second pair of opposed electrodes which are arranged in planes intersecting orthogonally to said first pair of electrodes, said second pair of electrodes being insulated from each other and arranged so that said ink column and the part of said ink column in which said ink droplets separate and fly from said ink column pass therebetween, and bias voltage-applying means to apply a bias voltage between said second pair of electrodes.

4. An ink-jet recording device according to claim 2, wherein said charging and deflecting means includes a second pair of opposed electrodes constructed integrally with said first pair of electrodes, said second pair of electrodes being constructed so that a spacing between said second pair of electrodes increases gradually in a traveling direction of said ink droplets.

5. An ink-jet recording device according to claim 2, 3 or 4, wherein said bias voltage-applying means includes bias power sources which are respectively connected to said first pair of electrodes and which have polarities opposite to each other.

6. An ink-jet recording device according to claim 2, 3 or 4, wherein said bias voltage-applying means is set so that said ink column situated between said first pair of electrodes is not charged by said bias voltage.

7. An ink-jet recording device according to claim 5, wherein said first pair of electrodes are parallel flat plates and are set so that said ink column passes through substantially the center between said first pair of electrodes, and wherein absolute values of the voltages of the respective bias power sources of the opposite polarities are set so as to be substantially equal to each other.

8. An ink-jet recording device comprising:
a nozzle which is supplied with ink pressurized to a predetermined pressure and which spouts an ink column from a nozzle hole thereof,
vibration applying means to apply mechanical vibrations of predetermined magnitude to said nozzle so as to separate a larger ink droplet and a smaller ink droplet from said column alternately and successively and to cause them to fly, and
a pair of charging and deflecting means for charging one of said smaller and larger ink droplets in response to a recording signal applied to said pair of charging and deflecting means and for deflecting said charged ink droplets in correspondence with a quantity of static charges thereon immediately after the separation of said ink droplet from an end point of said ink column, said pair of charging and deflecting means being disposed to oppose each other in the region of the end point of said ink column and extending in a traveling direction of said smaller and larger ink droplets.

9. An ink-jet recording device comprising:
a nozzle which is supplied with ink pressurized to a predetermined pressure and which spouts an ink column from a nozzle hole thereof,
vibration applying means to apply mechanical vibrations of predetermined magnitude to said nozzle so as to separate a larger ink droplet and a smaller ink droplet from said column alternately and successively and to cause them to fly, and
a pair of opposed charging and deflecting electrode means arranged so that said ink column and said larger and smaller ink droplets pass therebetween, said pair of opposed charging and deflecting electrode means being insulated from each other, said charging and deflecting electrode means being integrally formed to charge one of said smaller and larger ink droplets in response to a recording signal and to deflect said charged ink droplets in correspondence with a quantity of static charges thereon.

10. An ink-jet recording device according to claim 9, wherein a further pair of deflecting electrode means are disposed in a travel direction of said smaller and larger ink droplets for further deflecting said charged droplets in accordance with a quantity of static charges thereon.

11. An ink-jet recording device according to claim 9, wherein said charging and deflecting electrode means are formed of a first pair of opposed parallel flat electrodes and a second pair of opposed flat electrodes constructed so that a spacing between said second pair of flat electrodes increases gradually in a traveling direction of said smaller and larger ink droplets.

12. An ink-jet recording device according to claim 9 or 11, further comprising power sources providing voltages of opposite polarities respectively connected to said pair of charging and deflecting electrode means for deflecting said charged ink droplets.

13. An ink-jet recording device comprising:
a nozzle which is supplied with ink pressurized to a predetermined pressure and which spouts an ink column from a nozzle hole thereof,
vibration applying means to apply mechanical vibration of predetermined magnitude to said nozzle so as to separate a larger ink droplet and a smaller ink droplet from said column alternately and successively and to cause them to fly,
a pair of opposed charging electrode means arranged so that said ink column and said larger and smaller ink droplets pass therebetween, said charging electrode means being formed to charge one of said smaller and larger ink droplets in response to a recording signal applied to said pair of opposed charging electrode means, and
a pair of opposed deflecting electrode means arranged so that said ink column and said larger and smaller ink droplets pass therebetween, said pair of deflecting electrode means being insulated from each other and arranged in planes intersecting orthogonally to said charging electrode means, said deflecting electrode means being formed to deflect said charged ink droplets in correspondence with a quantity of static charges thereon.

14. An ink-jet recording device according to claim 13, further comprising power sources providing voltages of opposite polarities respectively connected to said pair of deflecting electrode means.

* * * * *